(12) United States Patent
Li et al.

(10) Patent No.: US 11,926,239 B2
(45) Date of Patent: Mar. 12, 2024

(54) VEHICLE CONTROL METHOD, MODULE, AND SYSTEM, DEVICE AND MEDIUM

(71) Applicant: Contemporary Amperex Technology Co., Limited, Ningde (CN)

(72) Inventors: Zhanliang Li, Ningde (CN); Zhimin Dan, Ningde (CN); Yu Yan, Ningde (CN); Miaomiao Zhang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 238 days.

(21) Appl. No.: 17/709,473

(22) Filed: Mar. 31, 2022

(65) Prior Publication Data

US 2023/0069189 A1 Mar. 2, 2023

Related U.S. Application Data

(63) Continuation of application No. PCT/CN2021/115742, filed on Aug. 31, 2021.

(51) Int. Cl.
*B60L 53/66* (2019.01)
*B60L 53/30* (2019.01)
(Continued)

(52) U.S. Cl.
CPC .............. *B60L 53/66* (2019.02); *B60L 53/305* (2019.02); *B60L 53/80* (2019.02); *B60L 58/12* (2019.02); *G07C 9/30* (2020.01); *H04W 4/80* (2018.02)

(58) Field of Classification Search
CPC ........ B60L 53/66; B60L 53/305; B60L 53/80; B60L 58/12; B60L 53/65; B60L 3/0046;
(Continued)

(56) References Cited

U.S. PATENT DOCUMENTS

| 7,228,447 B1* | 6/2007 | Day | G06F 1/28 |
| | | | 713/340 |
| 11,279,480 B1* | 3/2022 | Rezvani | H04W 24/04 |
| 2020/0164760 A1* | 5/2020 | Sohmshetty | B60L 53/53 |

FOREIGN PATENT DOCUMENTS

| CN | 105895973 A | 8/2016 |
| CN | 109552106 A | 4/2019 |
| (Continued) | | |

OTHER PUBLICATIONS

The First Office Action for JP Application No. 2021-558708, dated Nov. 6, 2023, 8 pages.
(Continued)

*Primary Examiner* — Behrang Badii
(74) *Attorney, Agent, or Firm* — East IP P.C.

(57) ABSTRACT

Embodiments of the present application provide a vehicle control method, module, and system, a device and a medium. The method includes: acquiring, under a condition that it is determined to install a target battery provided by a battery swapping station for the vehicle, a network address of a first battery management unit of the target battery; requesting to establish a wireless communication connection between a control module and the first battery management unit, based on the network address of the first battery management unit of the target battery; transmitting, under a condition that the wireless communication connection between the control module and the first battery management unit is successfully established, a first prompt signal to a target object, where the first prompt signal is used to prompt the target object to perform a relevant operation for allowing the vehicle to leave a battery swapping area.

12 Claims, 4 Drawing Sheets

(51) Int. Cl.
    *B60L 53/80*     (2019.01)
    *B60L 58/12*     (2019.01)
    *G07C 9/30*     (2020.01)
    *H04W 4/80*     (2018.01)

(58) Field of Classification Search
    CPC ........... B60L 53/68; B60L 58/10; G07C 9/30; G07C 9/10; H04W 4/80; H04W 4/30; H01M 2010/4278; H01M 10/4257; B60S 5/06; B60K 2001/0455; Y02T 10/70; Y02T 10/7072; Y02T 90/16; Y02T 90/12; Y02T 90/167; B60Y 2200/91
    See application file for complete search history.

(56) References Cited

FOREIGN PATENT DOCUMENTS

| CN | 209561570 U | 10/2019 |
|---|---|---|
| CN | 111415469 A | 7/2020 |
| CN | 112677812 A | 4/2021 |
| CN | 113009365 A | 6/2021 |
| EP | 3725604 A1 | 10/2020 |
| JP | 2007116799 A | 5/2007 |
| JP | 2011518710 A | 6/2011 |
| JP | 2012222945 A | 11/2012 |
| JP | 2013058399 A | 3/2013 |
| JP | 2019180226 A | 10/2019 |
| JP | 2022526110 A | 5/2022 |
| KR | 20210035858 A | 4/2021 |
| WO | 2020156771 A1 | 8/2020 |
| WO | 2021035298 A1 | 3/2021 |
| WO | 2021053802 A1 | 3/2021 |
| WO | 2021149467 A1 | 7/2021 |
| WO | 2021149468 A1 | 7/2021 |
| WO | 2021149488 A1 | 7/2021 |

OTHER PUBLICATIONS

The International search report for PCT Application No. PCT/CN2021/115742, dated May 26, 2022, 7 pages.
The First Office Action for KR Application No. 10-2021-7034570, dated Aug. 22, 2023, 8 pages.
The extended European search report for European Application No. 21844936.1, dated Apr. 5, 2023, 9 pages.

\* cited by examiner

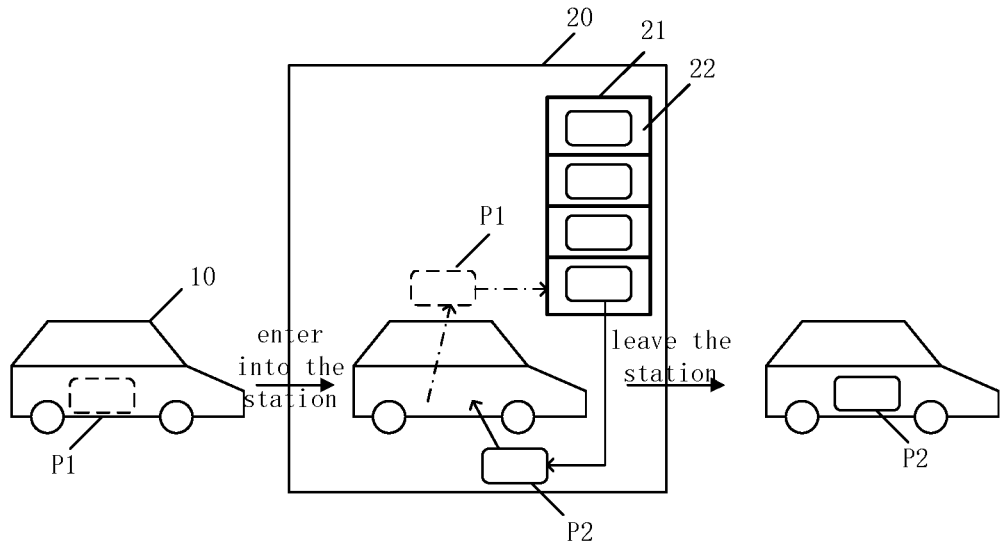

Fig. 1 acquiring, under a condition that it is determined to install a target battery provided by a battery swapping station for the vehicle, a network address of a first battery management unit of the target battery  — S210 equesting to establish a wireless communication connection with the first battery management unit of the target battery, based on the network address of the first battery management unit of the target battery  — S220 transmitting, under a condition that the wireless communication connection with the first battery management unit of the target battery is successfully established, a first prompt signal to a target object  — S230

Fig. 2

VEHICLE CONTROL METHOD, MODULE, AND SYSTEM, DEVICE AND MEDIUM

CROSS-REFERENCE TO RELATED APPLICATION

This application is a continuation of International Application No. PCT/CN2021/115742 filed on Aug. 31, 2021, which is incorporated herein by reference in its entirety.

TECHNICAL FIELD

The present application relates to a technical field of battery swapping, and in particular to a vehicle control method, module, and system, a device and a medium.

BACKGROUND

With the development of electric vehicles, the battery swapping technology for the vehicles has become one of the development ways of the battery technology. In the battery swapping technology, a power battery of a vehicle entered into a battery swapping station may be removed, and another power battery may be taken out from the battery swapping station to install on the vehicle.

At the present stage, since the batteries need to be transferred between the battery swapping station and different vehicles, there is no effective monitoring for abnormal behaviors such as unauthorized battery swapping and mistaken battery swapping, which affects the reliability of the battery swapping process.

Therefore, there is a need for a vehicle control solution that can improve the reliability of the battery swapping process.

SUMMARY

Embodiments of the present application provide a vehicle control method, module, and system, a device and a medium.

In a first aspect, an embodiment of the present application provides a vehicle control method, including:

acquiring, under a condition that it is determined to install a target battery provided by a battery swapping station for the vehicle, a network address of a first battery management unit of the target battery;

requesting to establish a wireless communication connection between a control module and the first battery management unit, based on the network address of the first battery management unit of the target battery;

transmitting, under a condition that the wireless communication connection between the control module and the first battery management unit is successfully established, a first prompt signal to a target object, where the first prompt signal is used to prompt the target object to perform a relevant operation for allowing the vehicle to leave a battery swapping area.

In an optional embodiment, the vehicle is provided with a telematics module;

the network address is forwarded to the control module by the telematics module after receiving the network address of the first battery management unit.

In an optional embodiment, transmitting, under a condition that the wireless communication connection between the control module and the first battery management unit is successfully established, the first prompt signal to the target object including:

acquiring, under a condition that the wireless communication connection between the control module and the first battery management unit is successfully established, a battery detection result of the target battery;

transmitting, under a condition that the battery detection result indicates that the target battery is in a normal state, the first prompt signal to the battery swapping station.

In an optional embodiment, the method further including:

under a condition that the wireless communication connection between the control module and the first battery management unit is successfully established, transmitting the network address to a control module of the battery swapping station, for establishing a binding relationship between the vehicle and the network address by the control module of the battery swapping station based on the network address, or transmitting the network address to a cloud server, for establishing a binding relationship between the vehicle and the network address by the cloud server based on the network address.

In an optional embodiment, the target object includes a control module of the battery swapping station, the relevant operation comprises a detection operation of detecting whether the battery detection result indicates that the target battery is in the normal state.

In an optional embodiment, the target object includes a control module of the battery swapping station, the relevant operation comprises an operation of controlling a battery swapping component to move to an original position.

In an optional embodiment, the target object includes a control module of the battery swapping station, the relevant operation comprises an operation of controlling a barrier gate to be in a first state, where the first state is used to release the vehicle.

In an optional embodiment, the target object includes a vehicle control unit of the vehicle;

the relevant operation comprises an operation of the vehicle control unit transmitting a first control instruction to a motor control unit (MCU) of the vehicle;

where the first control instruction is used to allow the MCU to control a motor of the vehicle to start.

In an optional embodiment, the control module includes a vehicle control unit and/or a target battery management unit.

In an optional embodiment, the network address is a Bluetooth communication address, and the wireless communication connection is a Bluetooth communication connection.

In a second aspect, an embodiment of the present application provides a vehicle control module, including:

an address acquisition unit configured to acquire, under a condition that it is determined to replace a first battery of a vehicle as a target battery provided by a battery swapping station, a network address of a first battery management unit of the target battery;

a connection establishment unit configured to request to establish a wireless communication connection between the control module and the first battery management unit based on the network address of the first battery management unit of the target battery;

a signal transmission unit configured to transmit, under a condition that the wireless communication connection between the control module and the first battery management unit is successfully established, a first prompt signal to a target object, where the first prompt signal is used to prompt the target object to perform a relevant operation for allowing the vehicle to leave a battery swapping area.

In an optional embodiment, the vehicle is provided with a telematics module;

the address acquisition unit is configured to acquire the network address of the first battery management unit, where the network address is forwarded to the control module by the telematics module after receiving the network address of the first battery management unit.

In an optional embodiment, the signal transmission unit includes:

a first detection subunit configured to acquire, under a condition that the wireless communication connection between the control module and the first battery management unit is successfully established, a battery detection result of the target battery;

a signal transmission subunit configured to transmit, under a condition that the battery detection result indicates that the target battery is in a normal state, the first prompt signal to the battery swapping station.

In an optional embodiment, the vehicle control module further includes:

an address transmission unit configured to, under a condition that the wireless communication connection between the control module and the first battery management unit is successfully established, transmit the network address to a control module of the battery swapping station, for establishing a binding relationship between the vehicle and the network address by the control module of the battery swapping station based on the network address, or transmit the network address to a cloud server, for establishing a binding relationship between the vehicle and the network address by the cloud server based on the network address.

In an optional embodiment, the target object includes a control module of the battery swapping station, the relevant operation comprises a detection operation of detecting whether the battery detection result indicates that the target battery is in the normal state.

In an optional embodiment, the target object includes a control module of the battery swapping station, the relevant operation comprises an operation of controlling a battery swapping component to move to an original position.

In an optional embodiment, the target object includes a control module of the battery swapping station, the relevant operation comprises an operation of controlling a barrier gate to be in a first state, where the first state is used to release the vehicle.

In an optional embodiment, the target object includes a vehicle control unit of the vehicle;

the relevant operation comprises an operation of the vehicle control unit transmitting a first control instruction to a motor control unit (MCU) of the vehicle;

where the first control instruction is used to allow the MCU to control a motor of the vehicle to start.

In an optional embodiment, the control module includes a vehicle control unit and/or a target battery management unit.

In an optional embodiment, the network address is a Bluetooth communication address, and the wireless communication connection is a Bluetooth communication connection.

In a third aspect, an embodiment of the present application provides a vehicle control system, including:

a first battery management unit of a target battery;

the control module provided by the second aspect or any of the optional embodiments in the second aspect.

In a fourth aspect, an embodiment of the present application provides a vehicle control device, including:

a processor and a memory storing computer program instructions;

where the processor, when reads and executes the computer program instructions, implements the vehicle control method provided by the first aspect or any of the optional embodiments in the first aspect.

In a fifth aspect, an embodiment of the present application provides a computer storage medium having computer program instructions stored thereon, where the computer program instructions, when executed by a processor, implement the vehicle control method provided by the first aspect or any of the optional embodiments in the first aspect.

BRIEF DESCRIPTION OF THE DRAWINGS

The drawings required to describe embodiments of the present application are introduced briefly below to illustrate technical solutions of the embodiments of the present application more clearly. Obviously, the drawings described below are only some embodiments of the present application, and other drawings may be obtained by those ordinary skilled in the art from those drawings without any creative work.

FIG. 1 is a schematic diagram of an exemplary scenario for battery swapping provided by an embodiment of the present application;

FIG. 2 is a schematic flowchart of a vehicle control method provided by an embodiment of the present application;

DETAILED DESCRIPTION

Figure 3:
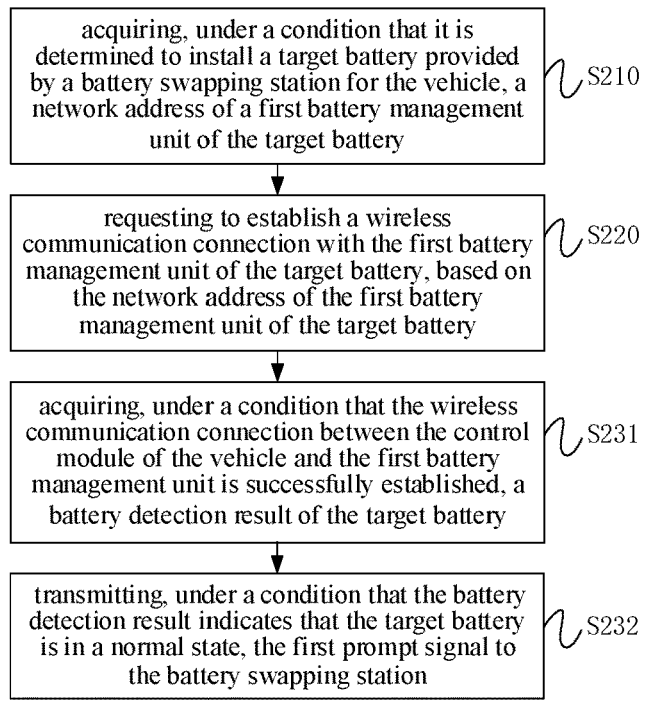
FIG. 3 is a schematic flowchart of another vehicle control method provided by an embodiment of the present application.

Features and exemplary embodiments of various aspects of the present application will be described in detail below. In order to make the objects, technical solutions and advantages of the present application clear, the present application will be further described in detail below in conjunction with the drawings and embodiments. It should be understood that the specific embodiments described herein are only configured for explaining the present application, and not configured for limiting the present application. For a person skilled in the art, the present application may be implemented without some of these specific details. The following descriptions of the embodiments are merely to provide a better understanding of the present application by illustrating the examples of the present application.

It should be noted that, in the present application, relational terms, such as first and second, are used merely to distinguish one entity or operation from another entity or operation, without necessarily requiring or implying any actual such relationships or orders of these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

With the rapid development of new energy technologies, various technologies serving the new energy have also been greatly improved. Considering the difficulty of charging, the slow charging rate, and the limited battery life, the battery swapping technology for new energy vehicles came into being.

The battery swapping technology adopts a way of separating the vehicle and the battery, which can provide a battery swapping service for the vehicle through a battery swapping station.

Nevertheless, the batteries will transfer between different battery swapping stations and different vehicles. Under a condition that there is no effective battery supervision strategy, abnormal behaviors such as unauthorized battery swapping and mistaken battery swapping will occur, which will affect the reliability of the battery swapping process.

Based on this, the embodiments of the present application provide a vehicle control method and device, a device and a medium, which can be applied to an application scenario for battery swapping of a new energy vehicle. Compared with the above related technologies, the reliability of the battery swapping process can be improved.

In order to better understand the present application, the embodiments of the present application firstly give specific explanations on the concepts such as a vehicle, a battery, and a battery swapping station involved in the present application in turn.

For the vehicle, the vehicle in the embodiments of the present application is detachably connected to the battery. In some embodiments, the vehicle may be a vehicle such as a car or a truck that uses batteries as a power source.

For the battery, the battery in the embodiments of the present application may be a lithium ion battery, a lithium metal battery, a lead acid battery, a nickel cadmium battery, a nickel hydrogen battery, a lithium sulfur battery, a lithium air battery, or a sodium ion battery and the like, which is not limited here. The battery may be used in an electric vehicle. In addition to being the power source of the electric vehicle, the battery may also supply power to other electrical devices in the electric vehicle, such as an onboard air conditioner, a car player and the like. In terms of scale, the battery in the embodiments of the present application may be a single battery cell with a wireless communication function, or may be a battery module or a battery pack, which is not limited here.

For the battery swapping station, in the embodiments of the present application, the battery swapping station may refer to a place that provides a battery swapping service for vehicles. For example, the battery swapping station may be a fixed place, or a mobile place such as a mobile battery swapping vehicle, which is not limited in the embodiments of the present application.

After introducing the above concepts, in order to facilitate understanding, before specifically describing the charging scheme of the power battery provided in the embodiments of the present application, the following parts of the embodiments of the present application will firstly describe an exemplary scenario for battery swapping in detail.

FIG. 1 is a schematic diagram of an exemplary scenario for battery swapping provided by an embodiment of the present application. As shown in FIG. 1, a battery swapping station 20 may include a battery swapping cabinet 21. The battery swapping cabinet 21 may include multiple charging compartments 22.

After a vehicle installed with a battery P1 enters into the battery swapping station 20, the battery swapping station 20 removes the battery P1 from the vehicle 10 through a battery swapping device, takes out a battery P2 from a charging compartment 22, and then installs the battery P2 on the vehicle 10. After that, the vehicle 10 installed with the battery P2 can drive away from the battery swapping station 20.

In addition, the removed battery P1 can be put into an idle charging compartment 22 for charging, so that the battery swapping station 20 can continue to provide the battery swapping service for other vehicles.

After introducing the scenario for battery swapping, next, the vehicle control method, device, and system, the device and the medium according to the embodiments of the present application will be described in detail. It should be noted that these embodiments are not used to limit the scope of the disclosure of the present application. The embodiments of the present application provide a detailed description of the vehicle control method.

According to some embodiments of the present application, the embodiments of the present application provide a vehicle control method. FIG. 2 is a schematic flowchart of a vehicle control method provided by an embodiment of the present application. The execution body of each step in FIG. 2 may be a control module of a vehicle.

As shown in FIG. 2, the vehicle control method 200 may include S210 to S230.

S210: acquiring, under a condition that it is determined to install a target battery provided by a battery swapping station for the vehicle, a network address of a first battery management unit of the target battery.

S220: requesting to establish a wireless communication connection between the control module and the first battery management unit, based on the network address of the first battery management unit of the target battery.

S230: transmitting, under a condition that the wireless communication connection between the control module and the first battery management unit is successfully established, a first prompt signal to a target object.

After preliminarily introducing the specific steps S210 to S230 of the vehicle control method 200, the technical terms involved in S210 to S230 are described in detail below.

For the control module of the vehicle, the control module of the vehicle is configured to control and manage the whole or part of the vehicle. In some embodiments, the control module of the vehicle may be a module or device provided in the vehicle body and having a control function. In some embodiments, the control module of the vehicle may be a vehicle control unit (Vehicle Control Unit, VCU) or a secondary battery management unit. Optionally, the secondary battery management unit is configured to manage the battery that is detachably connected to the vehicle body, and the secondary battery management unit is disposed in the vehicle body.

In some embodiments, under a condition that the secondary battery management unit is disposed in the vehicle body and the first battery management unit is disposed in the target battery, the secondary battery management unit may be referred to as a master battery management unit (Master Battery Management Unit, MBMU). The secondary battery management unit may manage one or more batteries connected to the vehicle through the first battery management units of the one or more batteries. In an example, the secondary battery management unit can manage the first battery management units of the one or more batteries. In an embodiment, the secondary battery management unit may serve as a slaver node when communicating with the battery swapping station via a Bluetooth connection, and may switch to serve as a master node when communicating with the first battery management unit. Thus, the flexible communication of the control module is realized, and the interaction capability of each module or device in the battery swapping system is improved. In another embodiment, the secondary battery management unit may always serve as the master node, thereby simplifying the development process of the communication module.

For the target battery, the target battery is one or more batteries selected from the battery swapping station and installed on the vehicle or planned to be installed on the vehicle. In some embodiments, under a condition that the number of batteries which can be connected to the vehicle is N, the number of target batteries may be a positive integer less than or equal to N, where N is a positive integer. For example, under a condition that the vehicle can be connected to three batteries, the number of target batteries can be three, two, or one. It should be noted that, the specific content of the target battery can be referred to the relevant description of the above parts of the embodiments of the present application, which will not be repeated here.

For the first battery management unit, the first battery management unit is configured to manage the target battery. The first battery management unit can be installed in the target battery, or alternatively, the first battery management unit can be installed outside the target battery. Exemplarily, the first battery management unit may be referred to as a slaver battery management unit (Slaver Battery Management Unit, SBMU).

For the wireless communication connection between the control module of the vehicle and the first battery management unit, the wireless communication connection may be a wireless communication connection established by using short-range wireless communication technologies such as Bluetooth, Zigbee, and WiFi. In an embodiment, the wireless communication connection between the control module of the vehicle and the first battery management unit may be a Bluetooth communication connection.

For the network address of the first battery management unit, the network address may be the wireless communication address of the first battery management unit, and the network addresses of the first battery management units of different batteries are different. That is, different batteries have different first battery management units, and different first battery management units have different network addresses. In an example, the vehicle needs to install two target batteries, namely battery A and battery B, and in addition, the vehicle also has battery C and battery D. The network address of the first battery management unit of the battery A, the network address of the first battery management unit of the battery B, the network address of the first battery management unit of the battery C, and the network address of the first battery management unit of the battery D are all different. In an embodiment, under a condition that the control module of the vehicle and the first battery management unit are connected by a Bluetooth connection, the network address of the first battery management unit is the Bluetooth communication address, for example, a media access control (Media Access Control, MAC) address of the first battery management unit.

In some embodiments, the network address of the first battery management unit of the target battery may be transmitted by the battery swapping station to the control module of the vehicle. Alternatively, the network address of the first battery management unit of the target battery may be transmitted by the cloud server to the control module of the vehicle, or may be transmitted by the cloud server to the control module of the vehicle through the battery swapping station.

For the first prompt signal, the first prompt signal is configured to prompt a target object to perform a relevant operation for allowing the vehicle to leave a battery swapping area. For the battery swapping area, the battery swapping area may be the entire battery swapping station, or may be a designated area where the vehicle needs to park when the battery is being swapped, which is not specifically limited in the embodiments of the present application. For the target object, the target object may be an object capable of performing a relevant operation for allowing the vehicle to leave the battery swapping area. The target object can be installed in the battery swapping station or in the vehicle body. In some examples, the target object may be the control module of the battery swapping station, or the VCU of the vehicle. It should be noted that, under a condition that the execution body of S210 to S230 and the target object are both the VCU of the vehicle, the execution body of S210 to S230 and the target object may be different functional modules of the VCU.

For S220, in some embodiments, under a condition that the control module is in a state for wireless communication connection, the wireless communication connection between the control module and the first battery management unit is established. In an example, after the vehicle enters into the battery swapping station, and after detecting that the high voltage is powered off for the entire vehicle, the wireless communication connection between the control module and the first battery management unit of the first battery is disconnected. After receiving the network address of the first battery management unit of the target battery, the wireless communication connection between the control module and the first battery management unit of the target battery may be established.

The establishment time of the wireless communication connection in S220 is described as follows.

In an example, the control module of the vehicle may request to establish a wireless communication connection between the control module of the vehicle and the first battery management unit of the target battery, after receiving the prompt information of successful battery swapping transmitted by the battery swapping station or the cloud server. The cloud server may be a physical server or a virtual server, which is not specifically limited in the embodiments of the present application.

In another example, the control module may request to establish a wireless communication connection between the control module and the first battery management unit of the target battery during the battery transportation process or during the battery swapping process, after the battery transportation device takes out the target battery from the charging compartment.

For S230, under a condition that the network address of the first battery management unit of the target battery acquired by the control module of the vehicle is correct, the control module of the vehicle can successfully establish a wireless communication connection with the first battery management unit of the target battery. Correspondingly, after the control module of the vehicle transmits the first prompt signal to the target object, the vehicle can leave the battery swapping station after the target object completes the relevant operation for allowing the vehicle to leave the battery swapping area. Accordingly, under a condition that a relevant person replaces the target battery provided by the battery swapping station with another battery, or the battery swapping station installs another battery by mistake, the wireless communication connection cannot be successfully established, and the control module of the vehicle cannot transmit the first prompt signal to the target object. Therefore, the relevant operation for allowing the vehicle to leave the battery swapping area cannot be performed, which will result in the vehicle being unable to leave the battery swapping area.

In some embodiments, in order to successfully control the vehicle, after it is determined that the wireless communication connection between the control module of the vehicle and the first battery management unit of the target battery is successfully established, the first prompt signal may be transmitted. For example, after it is determined that the control module and the first battery management unit of the target battery have performed three times handshake communication, the first prompt signal may be transmitted.

According to the vehicle control method 200 shown in the above steps S210 to S230, after the vehicle is installed with the target battery, the vehicle may establish a connection with the target battery based on the network address of the first battery management unit of the target battery. Since the first battery management unit of each battery has a unique network address, after the target battery is successfully installed on the vehicle, the control module of the vehicle can successfully establish a connection with the first battery management unit, and prompt the target object to control the vehicle to leave the battery swapping station. Therefore, when abnormal behaviors such as unauthorized battery swapping and mistaken battery swapping occur, the vehicle cannot successfully establish a communication connection based on the network address of the first battery management unit of the target battery, so that the vehicle cannot leave the battery swapping station, thereby improving the reliability of the battery swapping process.

In a specific scenario, under a condition that someone replaces the target battery as a low-quality battery, it may cause the low-quality battery to transfer between vehicles, and the low-quality battery often has a higher safety risk. According to the embodiments of the present application, under a condition that the battery is replaced privately, the vehicle cannot leave the battery swapping area, thereby avoiding the safety risk caused by the low-quality battery and improving the reliability of the battery swapping process.

In another specific scenario, under a condition that the target battery is replaced by another battery by mistake, if the voltage difference between that another battery and the remaining batteries of the vehicle is too large, it will cause the safety risk of the relay on the power supply line to be easily burned. Alternatively, if the difference between the service life of that another battery and the service life of the remaining batteries of the vehicle is too large, it will cause a difference in charge and discharge during use of these batteries and will accelerate power loss. According to this embodiment, under a condition that the battery is replaced incorrectly, the vehicle will not be able to leave the battery swapping area, thereby ensuring the safety of the battery and avoiding additional power loss.

According to some embodiments of the present application, optionally, the vehicle is provided with a telematics module;

The network address of the first battery management unit is forwarded to the control module of the vehicle by the telematics module after receiving the network address of the first battery management unit.

For the telematics module, the telematics module can be used for vehicle networking. The telematics module can be installed inside the vehicle. In some examples, the telematics module may be a device such as a telematics box (Telematics BOX, TBOX) or RDB (a kind of vehicle networking device) and the like. In an example, the telematics module can transmit information to the communication module of the battery swapping station. Specifically, data transmission network such as the global system for mobile communications (Global System for Mobile Communications, GSM) network, the 4th generation mobile communication technology (4th Generation Mobile Communication Technology, 4G) and the like can be used for communication between the telematics module and the communication module of the battery swapping station. According to this embodiment, the original telematics unit of the vehicle can be used to communicate with the battery swapping station, and no additional communication module is required, which saves costs.

In an example, after the battery swapping station obtains the network address of the first battery management unit, the battery swapping station may transmit it to the cloud server, and then the cloud server may transmit it to the telematics module. Finally, the telematics module may transmit it to the control module of the vehicle.

In another example, after the cloud server obtains the network address of the first battery management unit, the cloud server may transmit it to the telematics module, and then the telematics module may transmit it to the control module of the vehicle. The specific method for obtaining the network address of the first battery management unit by the cloud server and the battery swapping station can be referred to the relevant content of the above parts of the embodiments of the present application, which is not specifically limited here.

According to this embodiment, the original telematics module of the vehicle can be used to obtain the network address, which saves the cost of developing a communication module.

According to some embodiments of the present application, optionally, the network address of the first battery management unit of the target battery may be transmitted by the control module of the battery swapping station to the control module of the vehicle through Bluetooth communication.

Under a condition that the control module of the vehicle has a Bluetooth communication function, the network address can be directly obtained by the control module. Alternatively, the network address may also be obtained by a Bluetooth communication unit of the vehicle, and then may be transmitted to the control module by the Bluetooth communication unit.

For the control module of the battery swapping station, it can control the whole or part of the functions of the battery swapping station, for example, control the battery swapping process of the battery swapping station. The control module of the battery swapping station can be installed in the battery swapping station. Optionally, the control module of the battery swapping station may be a computer (PC for short)

of the battery swapping station, a server, or a tube battery management unit (Tube Battery Management Unit, TBMU) of the battery swapping station, and the like.

For the Bluetooth communication link between the control module of the battery swapping station and the control module of the vehicle, the Bluetooth communication link may be established after the vehicle arrives at the Bluetooth communication area of the battery swapping station.

In an embodiment, the control module of the vehicle may establish a Bluetooth communication link between the control module of the battery swapping station and the control module of the vehicle based on the network address of the battery swapping station.

In another embodiment, the control module of the battery swapping station may establish a Bluetooth communication link between the control module of the battery swapping station and the control module of the vehicle based on the network address of the control module of the vehicle.

In an example, the network address of the control module of the vehicle may be obtained by the control module of the battery swapping station through an information reading device from an information storage device disposed on the vehicle. In a specific example, for the specific types of the information storage device and the information reading device, the information storage device may be a device with a function of storing information and a function of being read by the information reading device. For example, the information storage device may be a radio frequency identification (Radio Frequency Identification, RFID) tag, and correspondingly, the information reading device may be an RFID reader. It should be noted that the information storage device and the information reading device may also be other corollary equipment with the functions of reading information and being read, such as a chip, which is not specifically limited. In a specific example, for the way of using the information reading device, the information reading device can be installed on a battery transportation device, so that the information reading device can read the physical address during the transportation of the power battery to the battery swapping cabinet. Exemplarily, after the vehicle arrives at a designated area, the physical address may be acquired by the information reading device. For example, the information reading device can be installed at the entrance of the battery swapping station, or the physical address can be read by the information reading device after the vehicle arrives at the designated battery swapping area.

In another example, the control module of the battery swapping station may determine the network address corresponding to the vehicle identification based on a pre-stored binding relationship between the vehicle identification and the network address according to the vehicle identification. The vehicle identification is used to uniquely identify the identity of the vehicle, such as a license plate number, a vehicle number, and the like. Exemplarily, the vehicle identification may be obtained by the battery swapping station from the battery swapping reservation information, or may be read by an information reading device. In a specific example, the information reading device may be a device that needs to be used in conjunction with an information storage device, such as the aforementioned RFID. The specific content of the information reading device can be referred to the relevant content of the above part of the embodiments of the present application, which will not be repeated here. In another specific example, the information reading device may be an image acquisition device. Specifically, the battery swapping station may obtain the license plate information of the vehicle through the image acquisition device after the vehicle arrives in the designated area. The image acquisition device may be a device or module with an image acquisition function such as a photographic device, a monitor, a camera and the like, which is not specifically limited. Exemplarily, the image acquisition device may be disposed at a corresponding position that can capture the license plate information of the vehicle at the entrance of the battery swapping station. Therefore, when the vehicle enters the battery swapping station, for example, when the vehicle waits for a barrier gate to open, the license plate information of the vehicle can be captured.

In another example, after the cloud server receives the battery swapping reservation information transmitted by the vehicle or the vehicle identification transmitted by the vehicle, the cloud server determines the network address corresponding to the vehicle identification based on a pre-stored binding relationship between the vehicle identification and the network address according to the vehicle identification. Then, the network address is transmitted to the control module of the battery swapping station.

It should be noted that the control module of the battery swapping station may also obtain the network address of the vehicle in other ways, which is not specifically limited.

In addition, it should be noted that the battery swapping station may also directly transmit the network address of the first battery management unit to the control module of the vehicle through other wireless communication ways, which is not specifically limited in the embodiments of the present application.

According to some embodiments of the present application, optionally, in order to improve the reliability of battery swapping process, FIG. 3 is a schematic flowchart of another vehicle control method provided by an embodiment of the present application. The difference between FIG. 3 and FIG. 2 is that the specific implementation of S230 may include S231 and S232.

S231: acquiring, under a condition that the wireless communication connection between the control module of the vehicle and the first battery management unit is successfully established, a battery detection result of the target battery.

S232: transmitting, under a condition that the battery detection result indicates that the target battery is in a normal state, the first prompt signal to the battery swapping station.

In some embodiments, the battery detection result of the target battery may be a detection result obtained after detecting the state of the target battery. The state detection for the target battery may be a detection of the electrical performance parameters of the target battery. In an example, since the target battery needs to output high voltage to the power structure of the vehicle when being used, in order to ensure safety after the target battery outputs high voltage (that is, the target battery is in a high voltage state), the state detection can be used to detect whether the target battery meets the high voltage condition. For example, whether at least one of the insulation characteristic of the target battery, the voltage difference between the multiple cells contained in the target battery, the voltages and temperatures of the target battery or the cells contained in the target battery is normal can be detected. For another example, under a condition that there are multiple target batteries, whether the voltage difference between the target batteries is normal can be detected. Exemplarily, detecting the insulation characteristic of the target battery may include detecting whether the positive electrode-to-ground insulation resistance of the target battery and the negative electrode-to-ground insulation resistance of the target battery are within a preset resistance value range, so that whether they are normal may be determined. For another example, under a condition that there are multiple target batteries, whether the voltage difference between the target batteries and/or the voltage difference between the multiple cells contained in the target battery is within a preset voltage difference range can be detected, so that whether target batteries are normal may be determined. In another example, whether the voltage of the target battery or the voltage of the battery cell contained in the target battery is within a preset voltage range can be detected, so that whether target battery is normal may be determined. In another example, whether the temperature value of the target battery or the temperature value of the battery cell contained in the target battery is within a preset temperature range can be detected, so that whether target battery is normal may be determined.

According to this embodiment, under a condition that it is determined that the target battery is safe through the state detection, the first prompt signal can be transmitted, so that the vehicle can leave the battery swapping area, thereby improving the safety of the battery swapping process.

Figure 4:
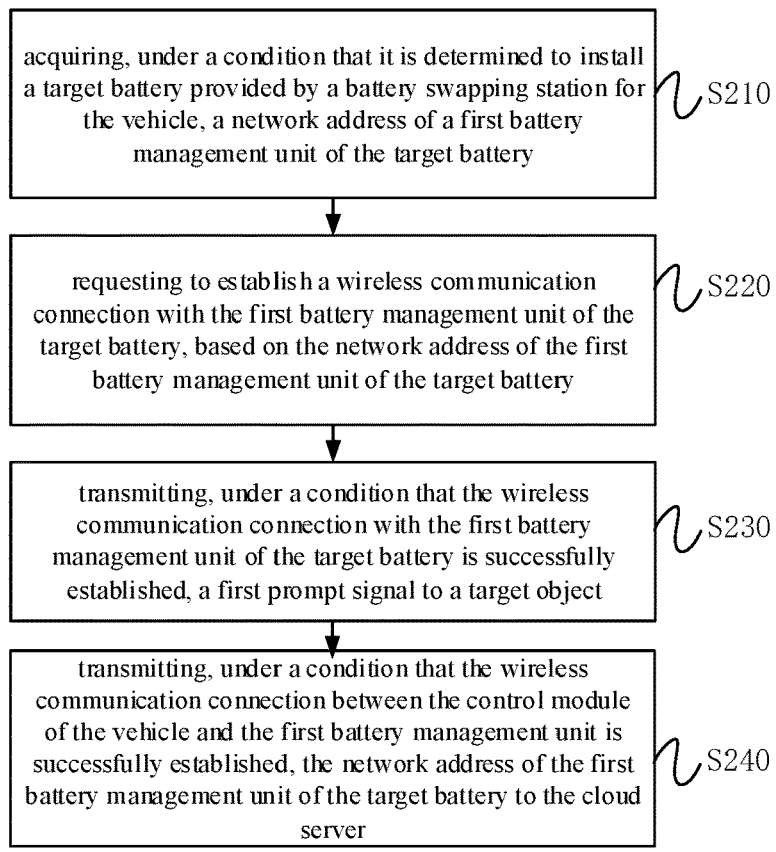
FIG. 4 is a schematic flowchart of yet another vehicle control method provided by an embodiment of the present application.

According to some embodiments of the present application, optionally, FIG. 4 is a schematic flowchart of yet another vehicle control method provided by an embodiment of the present application. The difference between FIG. 4 and FIG. 2 is that after S230, the vehicle control method 200 further includes S240.

S240: transmitting, under a condition that the wireless communication connection between the control module of the vehicle and the first battery management unit is successfully established, the network address of the first battery management unit of the target battery to a control module of the battery swapping station, for establishing a binding relationship between the vehicle and the network address by the control module of the battery swapping station.

In some embodiments, the binding relationship between the vehicle and the network address may include: a correspondence relationship between a vehicle 1 and batteries A1-A3; a correspondence relationship between a vehicle 2 and batteries B1-B3, and the like.

Optionally, in order to facilitate the management of the binding relationship between the vehicle and the battery, after the control module of the battery swapping station establishes the binding relationship between the vehicle and the network address, the binding relationship can be synchronized to other battery swapping stations. The control module of the battery swapping station can synchronize the binding relationship to the control modules of other battery swapping stations through the cloud server. Alternatively, the battery swapping station can directly communicate with other battery swapping stations to synchronize the binding relationship to other battery swapping stations, which is not limited in the embodiments of the present application.

According to this embodiment, the binding relationship between the vehicle and the network address of the first battery management unit of the target battery is established. Based on the binding relationship, during the next battery swapping process of the vehicle, the network address of the first management unit of the removed battery of the vehicle can be verified whether it is the same as the network address of the first battery management unit of the target battery. Under a condition that they are different, it means that the removed battery is not the target battery, that is, the target battery is privately replaced during the use outside of the battery swapping station. At this time, the control module can refuse to continue to provide the battery swapping service for the vehicle, thereby preventing low-quality batteries that have been privately installed from flowing into the battery swapping station, and ensuring the reliability of the battery swapping process.

Figure 5:
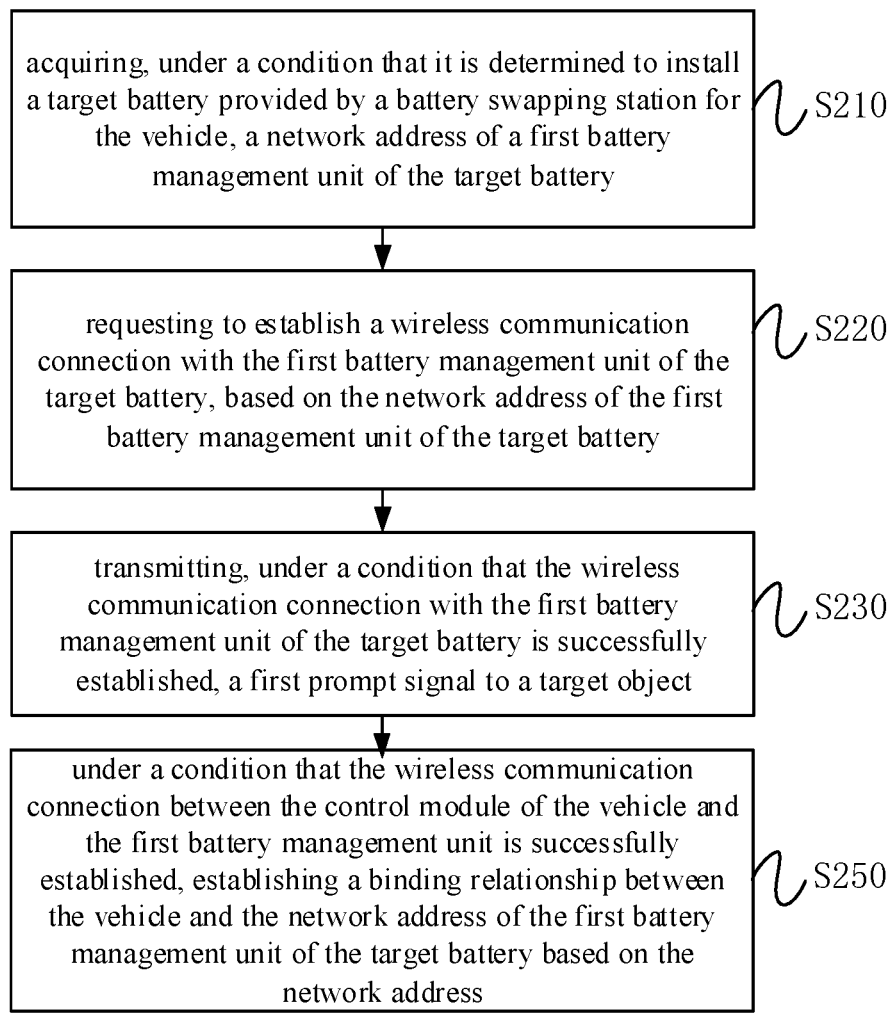
FIG. 5 is a schematic flowchart of yet another vehicle control method provided by an embodiment of the present application.

According to some embodiments of the present application, optionally, FIG. 5 is a schematic flowchart of yet another vehicle control method provided by an embodiment of the present application. The difference between FIG. 5 and FIG. 2 is that after S230, the vehicle control method 200 further includes S250.

S250: transmitting the network address of the first battery management unit to the cloud server, for establishing a binding relationship between the vehicle and the network address by the cloud server based on the network address.

It should be noted that, the difference between S250 and S240 lies in the execution body that establishes the binding relationship. That is, in S240, the binding relationship is established by the cloud server, and in S250, the binding relationship is established by the control module of the battery swapping station. In addition, the other content of S250 is similar to that of S240, and will not be repeated here.

According to this embodiment, the binding relationship between the vehicle and the network address of the first battery management unit of the target battery is established. Based on the binding relationship, during the next battery swapping process of the vehicle, the network address of the first management unit of the removed battery of the vehicle can be verified whether it is the same as the network address of the first battery management unit of the target battery. Under a condition that they are different, it means that the removed battery is not the target battery, that is, the target battery is privately replaced during the use outside of the battery swapping station. At this time, the control module can refuse to continue to provide the battery swapping service for the vehicle, thereby preventing low-quality batteries that have been privately installed from flowing into the battery swapping station, and ensuring the reliability of the battery swapping process.

According to some embodiments of the present application, optionally, in order to improve the reliability of the battery swapping process, the state of the target battery can be detected again before the vehicle leaves the battery swapping area.

Correspondingly, the target object includes a control module of the battery swapping station, the relevant operation comprises a detection operation of detecting whether the battery detection result indicates that the target battery is in the normal state.

According to this embodiment, the state of the target battery can be detected again. Therefore, under a condition that it is determined that the target battery is safe through the state detection, the first prompt signal can be transmitted, so that the vehicle can leave the battery swapping area, thereby improving the safety of the battery swapping process.

According to some embodiments of the present application, optionally, when the vehicle leaves the battery swapping area, there is a need to control the battery swapping component to move from the battery swapping position to the original position, so as to avoid safety problems caused by the battery swapping component staying on the driving path of the vehicle.

Correspondingly, the target object includes a control module of the battery swapping station, the relevant operation comprises an operation of controlling a battery swapping component to move to an original position.

The original position may be a position where the battery swapping component is placed when the battery swapping operation is not performed. The battery swapping component may be a device or structure that can swap a battery, such as a battery swapping robot, an automated guided vehicle (Automated Guided Vehicle, AGV) and the like, which is not specifically limited.

According to this embodiment, controlling the battery swapping component to move from the battery swapping position to the original position can avoid safety problems caused by the battery swapping component staying on the driving path of the vehicle.

According to some embodiments of the present application, optionally, in order to prevent the abnormal vehicle installed with a battery incorrectly or privately from affecting the driving safety of the vehicle, the reliability of the battery swapping station, the economy of the battery provider, and the quality of the battery in the battery swapping station, the vehicle should not leave unless it is determined that the vehicle is installed with the correct target battery.

Correspondingly, the target object includes a control module of the battery swapping station, the relevant operation comprises an operation of controlling a barrier gate to be in a first state, where the first state is used to release the vehicle.

For the barrier gate, it may be a device with a function of blocking or releasing vehicles. The barrier gate can be disposed at the exit position of the battery swapping area. In some examples, the barrier gate may be a straight pole, a telescopic gate, an elevating piling and the like.

Next, the embodiments of the present application will describe the relevant operation in detail in conjunction with the barrier gate.

In an example, the barrier gate may be a straight pole. Under a condition that the vehicle is allowed to leave, the straight pole can be controlled to lift to release the vehicle. Under a condition that the vehicle has left, the straight pole can be controlled to lay down, for example in a horizontal direction, so as to block other vehicles.

In another example, the barrier gate may be a telescopic gate. Under a condition that it is necessary to prevent the vehicle from leaving, one end of the telescopic gate and the other end of the telescopic gate may move away from each other. Under a condition that the vehicle is allowed to leave, one end of the telescopic gate and the other end of the telescopic gate may move towards each other.

In yet another example, the barrier gate may be an elevating piling. Under a condition that the vehicle is allowed to leave, the elevating piling may be lowered, so that the elevating piling may be below the ground. Under a condition that it is necessary to prevent the vehicle from leaving, the elevating piling may be raised, so that the elevating piling may be above the ground.

In some embodiments, in order to cooperate with the battery swapping station to manage the vehicle, the relevant operation may also include an operation of controlling the barrier gate to be in a second state after determining that the vehicle leaves the battery swapping station, and the second state is used to obstruct the passage of the vehicle.

According to this embodiment, under a condition that the target battery is exchanged privately or incorrectly, the abnormal vehicle can be prevented from leaving. Therefore, the driving safety of the vehicle, the reliability of the battery swapping station, the economy of the battery provider, and the quality of the battery in the battery swapping station may be guaranteed.

According to some embodiments of the present application, optionally, the target object includes a vehicle control unit of the vehicle;

the relevant operation comprises an operation of the vehicle control unit transmitting a first control instruction to a motor control unit (MCU) of the vehicle; where the first control instruction is used to allow the MCU to control a motor of the vehicle to start.

That is, when the target battery is installed on the vehicle, under a condition that the MCU does not receive the first control instruction transmitted by the vehicle control unit, the motor is prohibited from starting. At this time, the motor of the vehicle cannot be started. Under a condition that the MCU receives the first control instruction of the vehicle control unit, the motor is allowed to be started, and then the motor of the vehicle can be started.

According to this embodiment, under a condition that the target battery is exchanged privately or incorrectly, the vehicle can be prevented from starting, so that the vehicle cannot leave the battery swapping area. Therefore, the driving safety of the vehicle, the reliability of the battery swapping station, the economy of the battery provider, and the quality of the battery in the battery swapping station may be guaranteed.

It should be noted that, in order to guarantee the reliability of the battery swapping station, after receiving the first prompt signal, one or more target objects can be controlled to perform any one or more of the above relevant operations, which is not specifically limited in the embodiments of the present application.

Based on the same application concept, in addition to providing the vehicle control method, the embodiments of the present application also provide a corresponding vehicle control device.

The vehicle control device according to the embodiments of the present application will be described in detail in the followings with reference to the drawings.

Figure 6:
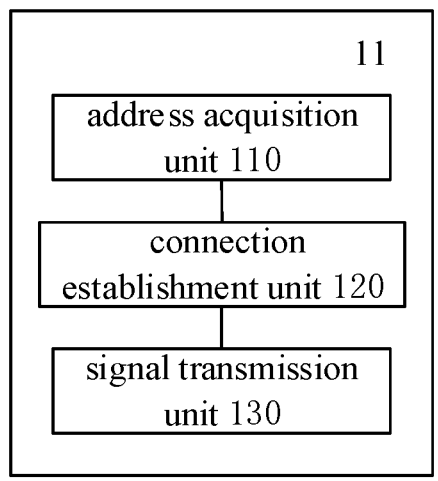
FIG. 6 is a schematic diagram of a structure of a control module provided by an embodiment of the present application.
Figure 7:
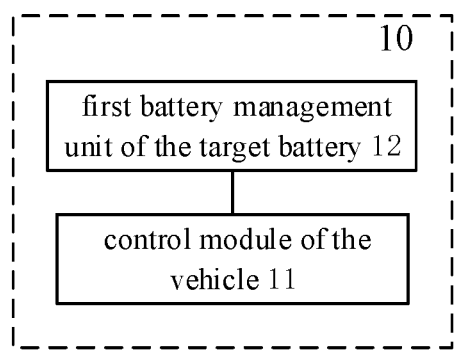
FIG. 7 is a framework diagram of an exemplary vehicle control system provided by an embodiment of the present application.

FIG. 6 is a schematic diagram of a structure of a control module provided by an embodiment of the present application. As shown in FIG. 6, the control module 11 of the vehicle includes:

an address acquisition unit 110 configured to acquire, under a condition that it is determined to install a target battery provided by a battery swapping station for a vehicle, a network address of a first battery management unit of the target battery;

a connection establishment unit 120 configured to request to establish a wireless communication connection between the control module and the first battery management unit based on the network address of the first battery management unit of the target battery;

a signal transmission unit 130 configured to transmit, under a condition that the wireless communication connection between the control module and the first battery management unit is successfully established, a first prompt signal to a target object, where the first prompt signal is used to prompt the target object to perform a relevant operation for allowing the vehicle to leave a battery swapping area.

In some embodiments of the present application, the vehicle is provided with a telematics module;

the network address is forwarded to the control module by the telematics module after receiving the network address of the first battery management unit.

In some embodiments of the present application, the signal transmission unit 130 includes:

a first detection subunit configured to acquire, under a condition that the wireless communication connection between the control module and the first battery management unit is successfully established, a battery detection result of the target battery;

a signal transmission subunit configured to transmit, under a condition that the battery detection result indicates that the target battery is in a normal state, the first prompt signal to the battery swapping station.

In some embodiments of the present application, the control module 11 of the vehicle further includes:

an address transmission unit configured to transmit, under a condition that the wireless communication connection between the control module and the first battery management unit is successfully established, the network address of the first battery management unit of the target battery to a control module of the battery swapping station, for establishing a binding relationship between the vehicle and the network address by the control module of the battery swapping station, or transmit, under a condition that the wireless communication connection between the control module and the first battery management unit is successfully established, the network address of the first battery management unit of the target battery to a cloud server, for establishing a binding relationship between the vehicle and the network address by the cloud server.

In some embodiments of the present application, the target object includes a control module of the battery swapping station, and the relevant operation comprises a detection operation of detecting whether the battery detection result indicates that the target battery is in the normal state.

In some embodiments of the present application, the target object includes a control module of the battery swapping station, and the relevant operation comprises an operation of controlling a battery swapping component to move to an original position.

In some embodiments of the present application, the target object includes a control module of the battery swapping station, and the relevant operation comprises an operation of controlling a barrier gate to be in a first state before determining the vehicle leaves the battery swapping station, where the first state is used to release the vehicle.

In some embodiments of the present application, the target object includes a control module of the battery swapping station, and the relevant operation comprises an operation of the vehicle control unit transmitting a first control instruction to a motor control unit (MCU) of the vehicle; where the first control instruction is used to allow the MCU to control a motor of the vehicle to start.

In some embodiments of the present application, the control module 11 of the vehicle includes a vehicle control unit and/or a secondary battery management unit.

In some embodiments of the present application, the network address is a Bluetooth communication address, and the wireless communication connection is a Bluetooth communication connection.

According to the control module of the vehicle of the embodiment of the present application, the binding relationship between the vehicle and the network address of the first battery management unit of the target battery is established. Based on the binding relationship, during the next battery swapping process of the vehicle, the network address of the first management unit of the removed battery of the vehicle can be verified whether it is the same as the network address of the first battery management unit of the target battery. Under a condition that they are different, it means that the removed battery is not the target battery, that is, the target battery is privately replaced during the use outside of the battery swapping station. At this time, the control module can refuse to continue to provide the battery swapping service for the vehicle, thereby preventing low-quality batteries that have been privately installed from flowing into the battery swapping station, and ensuring the reliability of the battery swapping process.

The other details of the vehicle control device according to the embodiments of the present application are similar to the vehicle control method described above in conjunction with the examples shown in FIGS. 2-5, and can achieve the corresponding technical effects, which are not repeated here for the sake of brevity.

Based on the same application concept, in addition to providing the control module of the vehicle, the embodiments of the present application also provide a corresponding vehicle control system.

The vehicle control system 10 according to the embodiments of the present application will be described in detail in the followings with reference to the drawings. The vehicle control system 10 includes:

a first battery management unit 12 of a target battery;

the control module 11 the vehicle in any of the above embodiments.

According to the vehicle control system provided by the embodiment of the present application, the binding relationship between the vehicle and the network address of the first battery management unit of the target battery is established. Based on the binding relationship, during the next battery swapping process of the vehicle, the network address of the first management unit of the removed battery of the vehicle can be verified whether it is the same as the network address of the first battery management unit of the target battery. Under a condition that they are different, it means that the removed battery is not the target battery, that is, the target battery is privately replaced during the use outside of the battery swapping station. At this time, the control module can refuse to continue to provide the battery swapping service for the vehicle, thereby preventing low-quality batteries that have been privately installed from flowing into the battery swapping station, and ensuring the reliability of the battery swapping process.

The other details of the vehicle control system according to the embodiments of the present application are similar to the vehicle control method and module described above in conjunction with the examples shown in FIGS. 2-6, and can achieve the corresponding technical effects, which are not repeated here for the sake of brevity.

Figure 8:
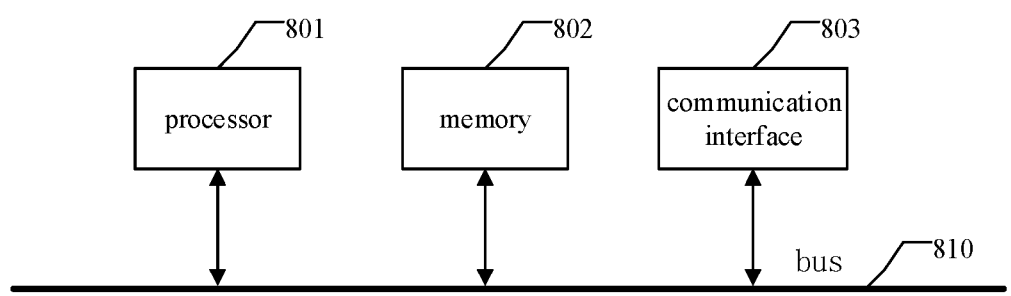
FIG. 8 illustrates a schematic diagram of a hardware structure of a vehicle control device provided by an embodiment of the present application.

FIG. 8 illustrates a schematic diagram of a hardware structure of a vehicle control device provided by an embodiment of the present application.

The vehicle control device may include a processor 801 and a memory 802 storing computer program instructions.

Specifically, the foregoing processor 801 may include a central processing unit (Central Processing Unit, CPU) or an application specific integrated circuit (Application Specific Integrated Circuit, ASIC), or may be configured as one or more integrated circuits implementing the embodiments of the present application.

The memory 802 may include a large-capacity memory for data or instructions. For example and without limitation, the memory 802 may include a hard disk drive (Hard Disk Drive, HDD), a floppy disk drive, a flash memory, an optical disk, a magneto-optical disk, a magnetic tape, or a universal serial bus (Universal Serial Bus, USB) drive, or a combination of two or more thereof. In some examples, the memory 802 may include a removable or non-removable (or fixed) medium, or the memory 802 is a non-volatile solid-state memory. In some embodiments, the memory 802 may be inside or outside the vehicle control device.

In some examples, the memory 802 may be a read only memory (Read Only Memory, ROM). In one example, the ROM may be a mask-programmed ROM, a programmable ROM (PROM), an erasable PROM (EPROM), an electrically erasable PROM (EEPROM), an electrically rewriteable ROM (EAROM), or a flash memory or a combination of two or more thereof.

The memory 802 may include a read only memory (ROM), a random access memory (RAM), a magnetic disk storage media device, an optical storage media device, a flash memory device, an electrical, optical, or other physical/tangible memory storage device. Therefore, the memory includes one or more tangible (non-transitory) computer-readable storage media (e.g., memory devices) encoded with software including computer-executable instructions, and the software, when executed (e.g., by one or more processors), is operable to perform the operations described with reference to the method according to one aspect of the present disclosure.

The processor 801 reads and executes the computer program instructions stored in the memory 802 to implement the methods/steps in the embodiments shown in FIG. 2-7, and achieve the corresponding technical effects of the methods/steps in the embodiments shown in FIG. 2-7, which is not repeated here for the sake of brevity.

In an example, the vehicle control device may further include a communication interface 803 and a bus 810. As shown in FIG. 8, the processor 801, the memory 802, and the communication interface 803 are connected through the bus 810 and complete communication with each other.

The communication interface 803 is mainly configured to implement communication between various modules, apparatuses, units and/or devices in the embodiments of the present application.

The bus 810 includes hardware, software, or both, and couples the components of the vehicle control device to each other. By way of example and without limitation, the bus may include an accelerated graphics port (Accelerated Graphics Port, AGP) or other graphics bus, an enhanced industry standard architecture (Extended Industry Standard Architecture, EISA) bus, a front side bus (Front Side Bus, FSB), a hyper transport (Hyper Transport, HT) interconnection, an industry standard architecture (Industry Standard Architecture, ISA) bus, an unlimited bandwidth interconnection, a low pin count (LPC) bus, a memory bus, a microchannel architecture (MCA) bus, a peripheral component interconnection PCI bus, a PCI-Express (PCI-X) bus, a serial advanced technology attachment (SATA) bus, a video electronics standards association local (VLB) bus or other suitable bus, or a combination of two or more thereof. Where appropriate, the bus 810 may include one or more buses. Although the embodiments of the present application describe and show a specific bus, the present application considers any suitable bus or interconnect.

The vehicle control device may execute the vehicle control method in the embodiments of the present application, so as to realize the vehicle control method and device described with reference to FIGS. 2-6.

In addition, in conjunction with the vehicle control methods in the foregoing embodiments, the embodiments of the present application may provide a computer storage medium for implementation. The computer storage medium stores computer program instructions; the computer program instructions, when executed by the processor, implement any one of the vehicle control methods in the foregoing embodiments.

It should be clear that the present application is not limited to the specific configuration and processing described above and shown in the drawings. For the sake of brevity, a detailed description of the known method is omitted here. In the above embodiments, several specific steps are described and shown as examples. Nevertheless, the method of the present application is not limited to the specific steps described and shown, and those skilled in the art can make various changes, modifications and additions, or can change the order between the steps after understanding the spirit of the present application.

The functional blocks shown in the above structural block diagram can be implemented as hardware, software, firmware, or a combination thereof. When implemented in hardware, the functional blocks can be, for example, an electronic circuit, an application specific integrated circuit (Application Specific Integrated Circuit, ASIC), appropriate firmware, a plug-in, a functional card, and so on. When implemented in software, the elements of the present application are programs or code segments used to perform required tasks. The programs or code segments may be stored in a machine-readable medium, or transmitted over a transmission medium or a communication link through a data signal carried in a carrier wave. The "Machine-readable medium" may include any medium that can store or transmit information. Examples of the machine-readable medium include an electronic circuit, a semiconductor memory device, an ROM, a flash memory, an erasable ROM (EROM), a floppy disk, a CD-ROM, an optical disk, a hard disk, an optical fiber medium, a radio frequency (RF) link, etc. The code segments can be downloaded via a computer network such as the Internet, the Intranet, and so on.

It should be noted that the exemplary embodiments mentioned in the present application describe some methods or systems based on a series of steps or devices. However, the present application is not limited to the order of the above steps, that is, the steps may be performed in the order mentioned in the embodiment or in an order different from that in the embodiment, or several steps may be performed at the same time.

Various aspects of the present disclosure are described above with reference to the flowcharts and/or block diagrams of the methods, apparatuses, devices, and computer program products according to the embodiments of the present disclosure. It should be understood that each block in the flowcharts and/or block diagrams and combinations of blocks in the flowcharts and/or block diagrams can be implemented by computer program instructions. These computer program instructions can be provided to a processor of a general-purpose computer, a special-purpose computer, or other programmable data processing devices to produce a machine that enables the implementation of functions/actions specified in one or more blocks of the flowcharts and/or block diagrams by executing these instructions via the processor of the computer or other programmable data processing devices. Such a processor may be, but not limited to, a general purpose processor, a dedicated processor, a special application processor, or a field programmable logic circuit. It can also be understood that each block in the block diagrams and/or flowcharts and combinations of blocks in the block diagrams and/or flowcharts can also be implemented by dedicated hardware that performs the specified functions or actions, or can be implemented by a combination of dedicated hardware and computer instructions.

Described above are merely specific embodiments of the present application. A skilled person in the art can clearly understand that, for the sake of convenience and briefness in description, the specific working processes of the above-described systems, modules and units may refer to the corresponding processes in the embodiments of the aforementioned methods, and details are not described herein again. It should be understood that the protection scope of the present application is not limited thereto. A skilled person in the art can readily conceive various equivalent modifications or replacements within the technical scope disclosed by the present application, and these modifications or replacements shall fall within the protection scope of the present application.

What is claimed is:

1. A vehicle control method applied to a control module installed in a vehicle, characterized by comprising:
    acquiring, under a condition that a target battery provided by a battery swapping station has been installed on the vehicle, a network address of a first battery management unit of the target battery;
    requesting to establish a wireless communication connection between the control module and the first battery management unit, based on the network address of the first battery management unit;
    transmitting, under a condition that the wireless communication connection between the control module and the first battery management unit is successfully established, a first prompt signal to a target object, wherein the first prompt signal is used to prompt the target object to perform a relevant operation for allowing the vehicle to leave a battery swapping area.

2. The method according to claim 1, wherein the vehicle is provided with a telematics module;
    the network address is forwarded to the control module by the telematics module after receiving the network address of the first battery management unit.

3. The method according to claim 1, wherein transmitting, under a condition that the wireless communication connection between the control module and the first battery management unit is successfully established, the first prompt signal to the target object comprises:
    acquiring, under a condition that the wireless communication connection between the control module and the first battery management unit is successfully established, a battery detection result of the target battery;
    transmitting, under a condition that the battery detection result indicates that electrical performance parameters of the target battery are within threshold ranges, the first prompt signal to the battery swapping station.

4. The method according to claim 1, further comprising:
    transmitting, under a condition that the wireless communication connection between the control module and the first battery management unit is successfully established, the network address of the first battery management unit to a control module of the battery swapping station, for establishing a binding relationship between the vehicle and the network address by the control module of the battery swapping station, or
    transmitting, under a condition that the wireless communication connection between the control module and the first battery management unit is successfully established, the network address of the first battery management unit to a cloud server, for establishing a binding relationship between the vehicle and the network address by the cloud server based on the network address.

5. The method according to claim 3, wherein the target object comprises a control module of the battery swapping station,
    the relevant operation comprises a detection operation of detecting whether the battery detection result indicates that the target battery is in the normal state.

6. The method according to claim 1, wherein the target object comprises a control module of the battery swapping station,
    the relevant operation comprises an operation of controlling a battery swapping component to move to an original position, wherein the original position is a position where the battery swapping component is placed when the battery swapping operation is not performed.

7. The method according to claim 1, wherein the target object comprises a control module of the battery swapping station,
    the relevant operation comprises an operation of controlling a barrier gate to be in a first state, and the first state is used to release the vehicle.

8. The method according to claim 1, wherein the target object comprises a vehicle control unit of the vehicle;
    the relevant operation comprises an operation of the vehicle control unit transmitting a first control instruction to a motor control unit (MCU) of the vehicle;
    wherein the first control instruction is used to allow the MCU to control a motor of the vehicle to start.

9. The method according to claim 1, wherein the control module comprises a vehicle control unit and/or a secondary battery management unit.

10. The method according to claim 1, wherein the network address of the first battery management unit is a Bluetooth communication address, and the wireless communication connection is a Bluetooth communication connection.

11. A vehicle control system, comprising:
    a first battery management unit;
    a control module, characterized by comprising:
        an address acquisition unit configured to acquire, under a condition that a target battery provided by a battery swapping station has been installed on a vehicle, a network address of a first battery management unit of the target battery;
        a connection establishment unit configured to request to establish a wireless communication connection between the control module and the first battery management unit based on the network address of the first battery management unit of the target battery;
        a signal transmission unit configured to transmit, under a condition that the wireless communication connection between the control module and the first battery management unit is successfully established, a first prompt signal to a target object, wherein the first prompt signal is used to prompt the target object to perform a relevant operation for allowing the vehicle to leave a battery swapping area.

12. A non-transitory computer storage medium having computer program instructions stored thereon, wherein the computer program instructions, when executed by a processor, implement the vehicle control method according to claim 1.

* * * * *